United States Patent
Sevagen

(10) Patent No.: US 10,018,258 B2
(45) Date of Patent: Jul. 10, 2018

(54) ACTUATOR HAVING AN ASSOCIATED LOCKING DEVICE AND TORQUE LIMITER

(71) Applicant: SAFRAN ELECTRONICS & DEFENSE, Boulogne Billancourt (FR)

(72) Inventor: Bertrand Sevagen, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 155 days.

(21) Appl. No.: 15/120,428

(22) PCT Filed: Feb. 20, 2015

(86) PCT No.: PCT/EP2015/053580
§ 371 (c)(1),
(2) Date: Aug. 19, 2016

(87) PCT Pub. No.: WO2015/124712
PCT Pub. Date: Aug. 27, 2015

(65) Prior Publication Data
US 2017/0009859 A1    Jan. 12, 2017

(30) Foreign Application Priority Data
Feb. 20, 2014   (FR) .................................. 14 51371

(51) Int. Cl.
*F16H 25/00*   (2006.01)
*F16H 25/24*   (2006.01)
(Continued)

(52) U.S. Cl.
CPC .......... *F16H 25/2454* (2013.01); *B64C 9/00* (2013.01); *B64C 13/28* (2013.01); *B64C 13/50* (2013.01);
(Continued)

(58) Field of Classification Search
CPC ...... F16H 25/2454; B64C 13/28; B64C 13/50
See application file for complete search history.

(56) References Cited

U.S. PATENT DOCUMENTS 2,411,101 A    11/1946  Millns
2,480,212 A    8/1949   Baines
(Continued)

FOREIGN PATENT DOCUMENTS

EP    2107265 A1    10/2009
EP    2354596 A1    8/2011

*Primary Examiner* — David M Fenstermacher
(74) *Attorney, Agent, or Firm* — Muncy, Geissler, Olds & Lowe, P.C.

(57) ABSTRACT

The invention relates to an actuator comprising a stationary structure and an actuating element that is movable relative to the stationary structure, a device for locking the actuating element in position which is mounted on the stationary structure and has a state for locking and a state for releasing the actuating element. The locking device comprises, successively, a stress limiter and at least one locking element so arranged as to be butting against one surface of the actuating element, in order to oppose a motion of the actuating element in a predetermined direction. The actuator comprises a member for controlling the locking device in the releasing state thereof and a member for resiliently returning the locking device to the locking state thereof.

10 Claims, 3 Drawing Sheets

(51) Int. Cl.
*F16D 67/00* (2006.01)
*H02K 7/112* (2006.01)
*B64C 13/28* (2006.01)
*B64C 9/00* (2006.01)
*B64C 13/50* (2006.01)
*F16D 127/00* (2012.01)

(52) U.S. Cl.
CPC ........... *F16D 67/00* (2013.01); *H02K 7/1125* (2013.01); *F16D 2127/004* (2013.01); *F16D 2127/005* (2013.01)

(56) References Cited

U.S. PATENT DOCUMENTS

| | | | | |
|---|---|---|---|---|
| 3,416,380 | A * | 12/1968 | Faustini | G01B 3/18 411/259 |
| 3,630,328 | A * | 12/1971 | Nelson | B64C 13/00 192/223 |
| 4,918,363 | A * | 4/1990 | Hollis | H01Q 1/125 310/83 |
| 5,832,779 | A * | 11/1998 | Madrid | F16H 25/20 137/72 |
| 8,113,076 | B2 * | 2/2012 | Daul | B60N 2/233 74/89.39 |
| 8,640,563 | B2 * | 2/2014 | Lang | B64D 41/007 74/89.37 |

* cited by examiner

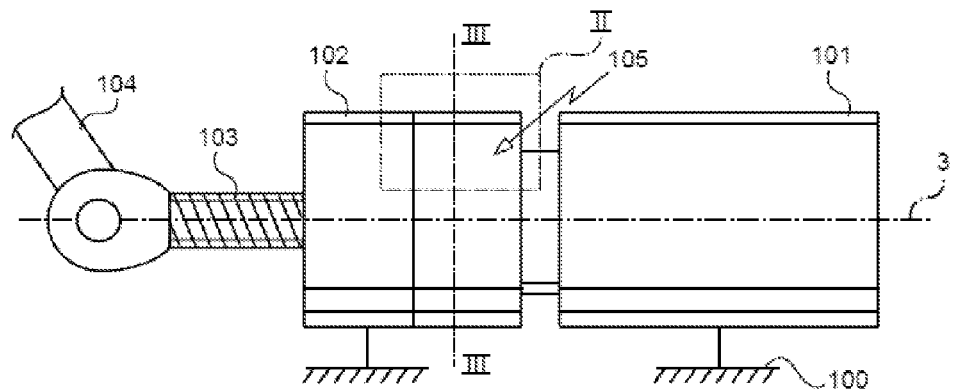
Fig. 1
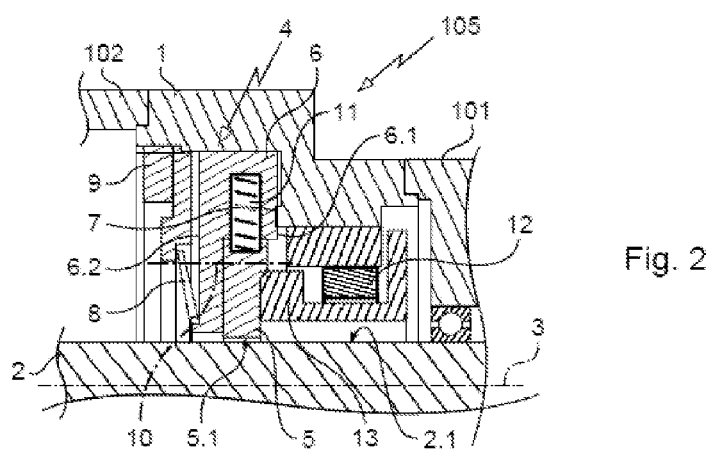
Fig. 2
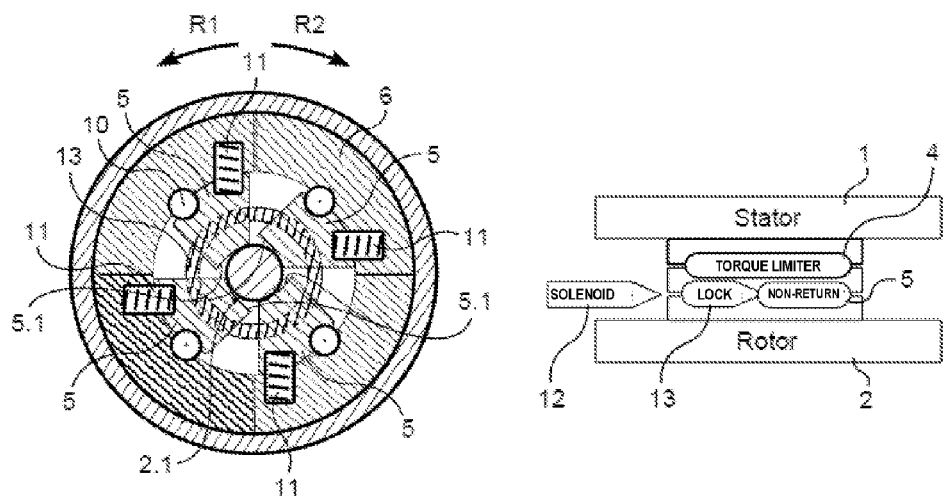
Fig. 3
Fig. 4

ACTUATOR HAVING AN ASSOCIATED LOCKING DEVICE AND TORQUE LIMITER

BACKGROUND OF THE INVENTION

Field of the Invention

The present invention relates to an actuator provided with a device for locking a movable element. The invention can be used for example in the field of aeronautics for locking an aileron or a flap on an aircraft. The actuator may be linear or rotary.

Brief Discussion of the Related Art

An actuator comprises a stationary structure and an actuating element which is movable relative to the stationary structure. In the aeronautics industry, the general trend favors actuators comprising a rotary electric motor driving a motion transmission system making it possible to push or pull a lever integral with the element to be moved.

The actuator generally comprises a device for locking the actuating element in position so as to prevent any accidental motion of the movable element when the electric motor is no longer powered, for example after a failure.

The locking device has a state for releasing the actuating element dedicated to a normal mode of operation of the engine and a locking state dedicated to an engine failure mode. The rotationally locking device generally comprises a stator, a rotor so mounted as to pivot about a pivot axis, at least one locking element mounted between the stator and the rotor so as to be movable between a position of interaction with the rotor and the stator and a position retracted relative to the rotor, and means for actuating the locking element between such two positions.

The device may be so arranged as to prevent the rotation of the rotor whatever the direction of rotation. Alternately, the device may be so arranged as to prevent the rotation of the rotor in only one direction of rotation and to enable the free rotation in the opposite direction.

The device of the latter better-known type is a free-wheel unit, the locking member of which is a pawl or a roller which is returned to the interaction position by a resilient return element. The rotor is then free to rotate in one of the directions of rotation, whereas the locking element opposes the rotation of the rotor in the other direction of rotation.

BRIEF SUMMARY OF THE INVENTION

The aim of the invention is to provide a locking device that is effective and reliable while having a limited overall size, relatively low mass and relatively low rotor inertia.

For this purpose, according to the invention, an actuator is provided for, which comprises a stationary structure and an actuating element that is movable relative to the stationary structure, a device for locking the actuating element in position which is mounted on the stationary structure and has a state for locking and a state for releasing the actuating element. The locking device comprises, successively, a stress limiter and at least one locking element so arranged as to rest on a surface of the actuating element, so as to oppose by butting up against a motion of the actuating element in a predetermined direction. The actuator comprises a member for controlling the locking device in the releasing state thereof, and a member for resiliently returning the locking device to the locking state thereof.

The invention thus makes it possible to provide a controlled locking system actuator associating an overcenter locking element and a stress limiter making it possible to clip the peaks of the stress applied to the parts of the actuator upon the butting up of the locking element. Having an overcenter locking element makes it possible to have a locking at any position of the actuating element (and not only at one tooth as with a pawl). The locking device according to the invention further provides a progressive locking and a protection of the actuator components, and of the structures connected to the actuator as regards the jerk upon locking the device. The rebound problems which may arise with pawls when they land on the top of a tooth of the ratchet wheel are also eliminated.

Other characteristics and advantages of the invention will appear upon reading the following description of not restrictive particular embodiments of the invention.

BRIEF DESCRIPTION OF THE DRAWINGS

Reference will be made to the appended drawings, wherein:

FIG. 1 is a schematic view of an actuator according to a first embodiment of the invention, FIG. 2 is a partial schematic view of the actuator in a section along the II-II line of FIG. 1, FIG. 3 is a partial schematic view, in cross section, of the actuator according to the first embodiment of the invention, FIG. 4 is a schematic view of the locking device according to the first embodiment of the actuator.

DETAILED DISCUSSION OF THE PREFERRED EMBODIMENTS

Figure 5A:
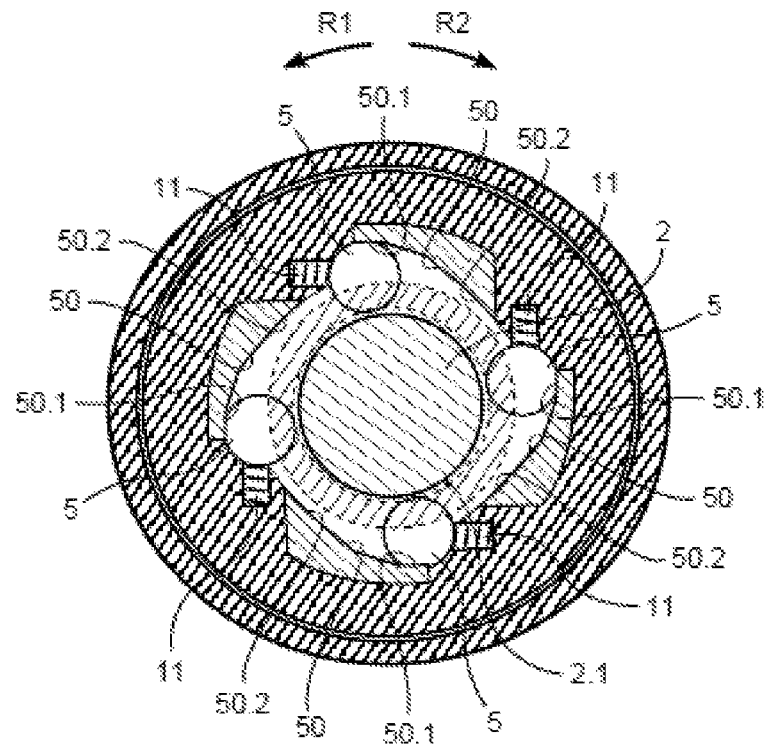
FIG. 5a is a view similar to FIG. 3 of a locking device according to an alternative embodiment.

The invention is described herein in accordance with an actuator of a moving surface of flight of an aircraft. This moving surface of flight is for example a rudder, a flap, an elevon, an aileron or the like.

Referring to FIG. 1, such a rotary actuator comprises a stationary structure, a rotationally movable member, and an engine member driving the movable member into rotation relative to the stationary structure. More specifically, the actuator here comprises a frame 100 whereon is mounted a rotary electric motor 101 having an output shaft driving, via a reduction gear 102, the nut of a nut and threaded shaft motion transmission system. The nut is so mounted as to be free in rotation and stationary in translation relative to the frame 100. The threaded shaft 103 is engaged in the nut and has one end connected to a lever 104 integral with the rudder.

The actuator also comprises a rotationally locking device so that, if power fails, the rudder can return to its neutral position but cannot come out due to the effect of aerodynamic forces. The locking device, generally designated 105, is mounted between the engine 101 and the reduction gear 102.

Referring to FIGS. 2 to 4 too, the locking device 105 according to the invention comprises a stator 1 connected to the stationary structure and a rotor 2 rotationally integral with the output shaft of the engine 101 and so mounted as to pivot about a pivot axis 3. The stator 1 has here the shape of a ring mounted about the rotor 2, with the stator 1 and the rotor 2 being coaxial to each other. The stator 1 here forms a case having one end integral with the engine case 101 and one end integral with the reduction gear case 102.

The locking device 105 successively comprises a stress limiter, here a torque limiter, generally referred to as 4, and locking elements 5 carried by the torque limiter 4.

The torque limiter 4 comprises a ring 6 mounted in the stator 1, coaxially to the rotor 2. The rotor 2 is so mounted as to have some axial clearance parallel to the axis 3 and be free to rotate relative to the stator 1. The ring 6 has a friction face 6.1 opposite a friction surface 7 of the stator 1 and a face 6.2 whereon a preloaded spring 8 presses via a threaded ring 9 screwed in the stator 1 parallel to the axis 3. It should be understood that the threaded ring 9 makes it possible to adjust the stress provided by the spring 8 applying the ring 6 against the friction surface 7 and thus the torque beyond which the ring 6 can be rotationally driven relative to the stator 1.

The locking elements 5 are here four in number, and positioned about the rotor 2. Each locking element 5 is a jaw mounted on the ring 6 to pivot eccentrically about an axis 10 parallel to the axis 3 between a first position in which the jaw is separated from the peripheral surface 2.1 of the rotor 2 and a second position in which the jaw has a surface 5.1 bearing against the surface 2.1. A spring 11 is mounted between each locking element 5 and the ring 6 to press the locking element 5 toward the second position thereof.

The surface 5.1 is so arranged that, when the locking element 5 is in the second position thereof, the rotor 2 is free to rotate in a first direction of rotation RI and prevents the rotation of the rotor 2 in a second direction of rotation R2 by butting up against the rotor 2. For this purpose, the arrangement is so designed that the line, from the point of pivoting of the jaw to the contact point, and the normal to the contact surface form an angle smaller than the angle of friction of the two materials on one another. The locking elements 5 thus exert, by a wedging effect, an increasing clamping force of the rotor 2 subjected to an input torque in the second direction of rotation and increasingly oppose the rotation thereof. It should be noted that, because of this butting up, initiating a motion of the rotor 2 in the direction of rotation RI is necessary to loosen the locking elements 5, before the locking elements 5 can be relatively easily brought back to the second position thereof.

Thus:
when the locking elements 5 are in the first position thereof, the locking device is in a rotor 2 releasing state, and
when the locking elements 5 are in the second position thereof, the locking device is in a rotor 2 locking state.

The springs 11 thus form a member for resiliently returning the locking device to the locking state thereof.

The actuator comprises a member controlling the locking device in the releasing state thereof.

The controlling member comprises a solenoid 12 and power supply means, not shown but known per se, so arranged that the powered solenoid 12 can hold the locking elements off said rotor 2 surface 2.1 against the returning members.

In the embodiment more particularly described here, the controlling member comprises an annular lock which is movable 13 parallel to the axis 3 between a holding position in which the lock 13 forms a stop which prevents the locking elements from resting against the surface 2.1 and a release position in which the lock 13 lets the locking elements free to rest on the surface 2.1 of the rotor 2 under the effect of the returning members 11. The solenoid 12 is so arranged as to move the lock 13 to the holding position thereof when powered, with the power supply of the solenoid 12 being provided in the operating mode in which the engine is also powered. The lock 13 and the locking elements cooperate through cam surfaces so arranged that, when the lock is moved from the locking element release position to the locking element holding position, while the locking element is in contact with said surface of the actuating element, the lock causes the separation of the locking member from said surface.

It should be understood that, if the solenoid 12 is not powered, the locking elements 5 are moved to the second position thereof by the springs 11 by pushing the lock 13 towards the release position thereof. If the rotor 2 is subjected to a torque in the direction of rotation R2, the locking elements 5 butt up and oppose the rotational motion. If the rotor 2 input torque is smaller than the one required to overcome the friction of the friction face 6.1 of the ring 6 against the friction surface 7, the rotor 2 is prevented from rotating. If the rotor 2 input torque is higher than the one required to overcome the friction of the ring 6 on the friction surface 7, the rotor 2 drives the locking elements 5 and the ring 6, the friction face 6.1 of which will rub on the friction surface 7 and slow down the rotation of the rotor 2.

The axially sliding arrangement of the lock 13 ensures good resistance to the holding of the locking elements 5 even in case of vibrations.

Figure 5B:
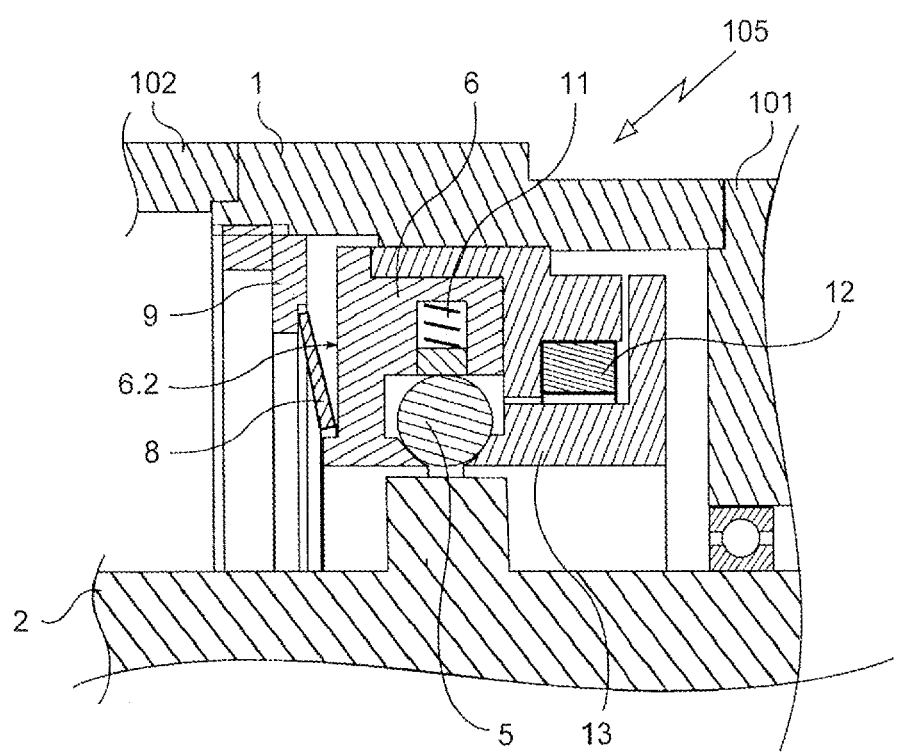
FIG. 5b is a view analog to FIG. 2 of such alternative embodiment.

In the alternative solution shown in FIGS. 5a and 5b, the locking elements 5 are rollers or balls liable to roll on ramps 50 of the stator 1. In an advantageous embodiment, the balls are preferred to the rollers to prevent any misalignment when rolling over the ramps.

Each ramp 50 has a first end 50.1 provided with a recess for receiving the respective ball and a second end 50.2 extending to a certain distance from the pivot axis 3 which is smaller than a distance separating the first end 50.1 and the pivot axis 3. Thus, when the balls are in the recesses, they define a contour having a diameter greater than the diameter of the rotor 2, whereas, when the balls are in the vicinity of the ends 50.2, they define a contour having a diameter substantially equal to the diameter of the rotor 2.

It should then be understood that:
when the balls are in the recesses, due to the action of the lock 13, they enable the rotor 2 to rotate freely in both directions of rotation (position shown in FIGS. 5a and 5b),
when the balls rest on the ramps 50 in the vicinity of the ends 50.2, the locking members oppose the rotation of the rotor 2 in the direction of rotation R2 (in this direction of rotation, the balls tend to be returned to the second end 50.2 of the ramps 50 due to their friction on the rotor 2 and accordingly they exert an increasing frictional force onto the rotor 2 until a wedging is obtained) and enable the rotor 2 to rotate freely in the direction of rotation RI (in this direction of rotation, the balls tend to be returned toward the first end 50.1 of the ramps 50).

The same elements or elements similar to those described above are given identical numerical references in the following description of the other embodiments while referring to FIGS. 6 to 9.

Figure 6:
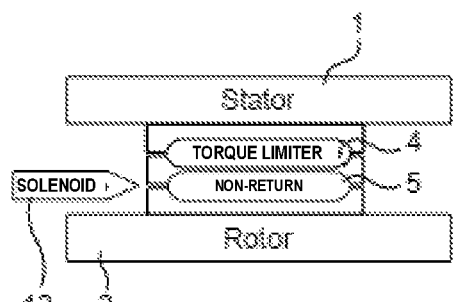
FIGS. 6, 7, 8, 9 are views analog to FIG. 4 of an actuator according to the second, third, fourth and fifth embodiments of the invention.

According to the second embodiment shown in FIG. 6, the locking device 105 has a structure identical to the one previously described, except that it has no lock. The solenoid 12 is so arranged as to directly draw the locking elements 5 to the second position thereof. For this purpose, the solenoid may have the shape of a coil extending into the ring 6 coaxially with the axis 3.

Figure 7:
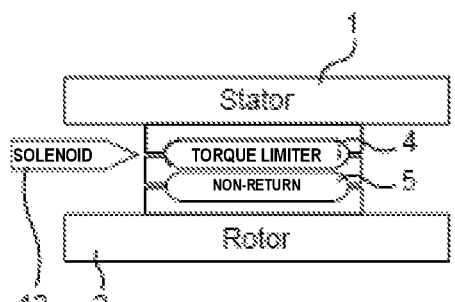

According to the third embodiment shown in FIG. 7, the locking device 105 has a structure identical to the one previously described, except that the locking elements 5 are integral with a rotary intermediate support and the solenoid 12 is so arranged as to disengage the support from the ring 6 of the torque limiter 4 of the locking device 105. Thus, when the solenoid is powered, the locking members 5 are freely driven by the shaft 2. If the solenoid is not powered, the support is made integral with the ring 6 so that, if the shaft 2 rotates in the direction of rotation R2, the support will tend to drive the ring 6, the friction face 6.1 of which rubs against the friction surface 7 and opposes the motion in the direction of rotation R2.

In an alternate embodiment, the locking elements 5 are mounted on the ring 6 and the solenoid is so arranged as to hold the ring 6 in a position spaced from the friction surface 7 by opposing the action of the return spring 8. In the off position, the torque limiter thus does not oppose the rotation of the shaft 2. This assumes, however, that the solenoid is relatively powerful, since it must oppose the return spring 8.

Figure 8:
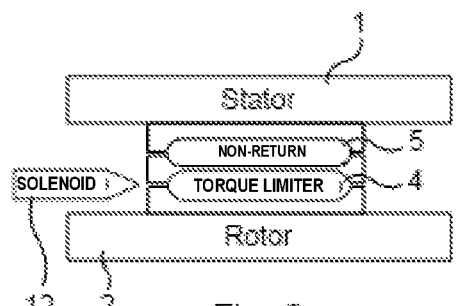
Figure 9:
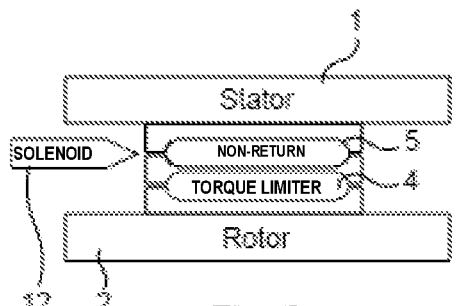

According to the fourth and fifth embodiments shown in FIGS. 8 and 9 respectively, the locking device 105 comprises a torque limiter 4 and locking elements 5 as above, but the locking elements 5 are mounted on a support positioned between the stator 1 and the torque limiter 4, and no longer between the rotor 2 and the torque limiter 4 as in the previous embodiments. The support 5 of the locking members is integral with the stator 1 and the locking elements 5 are so mounted as to rest against a cylindrical surface of the ring 6. The friction face of the ring 6 is applied against a radial surface which rotates together with the shaft 2 by an elastic element.

As previously, the actuator comprises a solenoid forming a member for controlling the locking device.

According to the fourth embodiment shown in FIG. 8, the solenoid 12 is so arranged as to hold the friction face of the ring 6 away from the radial surface of the shaft 2. Thus, when the solenoid is powered, the shaft 2 freely pivots without being slowed down by the torque limiter. If the solenoid is not powered, the friction face rests against the radial surface of the rotor 2 which drives the ring in rotation 6. In this case, if the rotor 2 is subjected to a torque in the direction of rotation Rl, the locking elements 5 enable the free motion of the ring 6. If the rotor 2 is subjected to a torque in the direction of rotation R2, the locking elements 5 butt up and oppose the motion of rotation of the crown 6 and thus of the rotor 2.

In the fifth embodiment of FIG. 9, the solenoid is so arranged as to directly draw the locking elements 5 into the second position thereof. Thus, when the solenoid is powered, the locking elements 5 are held at a certain distance from the crown 6 which is free to rotate together with the rotor 2. When the solenoid is not powered and the rotor rotates in the direction of rotation RI, the locking elements 5 enable the free rotation of the ring 6 and hence of the rotor 2. When the solenoid is not powered and the rotor rotates in the direction of rotation R2, the locking elements 5 butt up on the ring 6, which rubs against the rotor 2 and opposes the pivoting of the rotor 2.

Of course, the invention is not limited to the embodiments described but encompasses any alternative solution within the scope of the invention as defined by the claims.

In particular, the locking device may be integrated in the engine or in a reduction unit associated with the engine, or still be separated from the engine.

The rotor may have the shape of a ring mounted to rotate about the stator.

Besides, the number and the type of locking elements may be different from those described above.

The lock can act onto the supporting element or onto the torque limiter.

The locking elements may be arranged symmetrically around the rotor 2.

The actuator may be a linear or a rotary actuator.

The invention claimed is:

1. An actuator comprising a stationary structure and an actuating element that is movable relative to the stationary structure, with a device for locking the actuating element in position being mounted on the stationary structure and having a state for locking and a state for releasing the actuating element, characterized in that the locking device comprises, successively, a stress limiter and at least one locking element so arranged as to rest on a surface of the actuating element so as to oppose, by butting up against a motion of the actuating element in a predetermined direction, in that the actuator comprises a member for controlling the locking device in the releasing state thereof and a member for resiliently returning the locking device to the locking state thereof.

2. The actuator according to claim 1, wherein the stress limiter comprises a friction element which is applied against a surface integral with the stationary structure and which carries the locking element.

3. The actuator according to claim 2, wherein the returning member is so arranged as to apply the locking element against said surface of the actuating element and the controlling member comprises a solenoid and supply means so arranged that the powered solenoid maintains the locking element off said surface against the returning member.

4. The actuator according to claim 3, wherein the controlling member comprises a lock which is movable between a release position in which the lock forms a stop preventing the locking element from resting against the actuating element and a holding position in which the lock lets the locking member free to rest on the actuating element under the action of the returning member, with the solenoid being so arranged as to move the lock towards the position in which the locking element is maintained in the release position.

5. The actuator according to claim 4, wherein the movable lock and the locking element cooperate through cam surfaces so arranged that, when the lock is moved from the release position of the locking element to the position thereof maintaining the locking member, whereas the locking member is in contact with said surface of the actuating element, the lock causes the breaking of contact between the locking element and said surface.

6. The actuator according to claim 4, wherein the lock is movable in a direction parallel to the actuating element.

7. The actuator according to claim 1, wherein the locking element is mounted on the stationary structure and acts on a surface of the stress limiter.

8. The actuator according to claim 1, wherein the actuating element is so mounted as to pivot relative to the stationary structure.

9. The actuator according to claim 1, wherein the actuating element comprises a transmission line having a relatively high speed shaft and a relatively low speed shaft, and the locking device is so mounted as to act on the relatively high speed shaft.

10. The actuator according to claim 1, wherein the locking element is a ball, a roller or an eccentrically pivoting jaw.

* * * * *